(12) United States Patent
Havet et al.

(10) Patent No.: US 12,145,634 B2
(45) Date of Patent: Nov. 19, 2024

(54) TRACTION ASSEMBLY INCLUDING A LOCOMOTIVE AND A TENDER AND ASSOCIATED METHOD

(71) Applicant: ALSTOM Transport Technologies, Saint-Ouen-sur-Seine (FR)

(72) Inventors: Jean-Luc Havet, Evette Salbert (FR); Arnaud Heidet, Belfort (FR)

(73) Assignee: ALSTOM Transport Technologies, Saint-Ouen-sur-Seine (FR)

( * ) Notice: Subject to any disclaimer, the term of this patent is extended or adjusted under 35 U.S.C. 154(b) by 275 days.

(21) Appl. No.: 17/443,069

(22) Filed: Jul. 20, 2021

(65) Prior Publication Data
US 2022/0024496 A1 Jan. 27, 2022

(30) Foreign Application Priority Data

Jul. 27, 2020 (FR) .................................. 20 07880

(51) Int. Cl.
*B61C 3/02* (2006.01)
*B60L 5/20* (2006.01)
(Continued)

(52) U.S. Cl.
CPC ................. *B61C 3/02* (2013.01); *B60L 5/20* (2013.01); *B60L 9/08* (2013.01); *B60L 9/30* (2013.01);
(Continued)

(58) Field of Classification Search
CPC ..... B61C 3/00; B61C 3/02; B60L 5/18; B60L 5/20; B60L 5/24; B60L 5/26; B60L 9/00;
(Continued)

(56) References Cited

U.S. PATENT DOCUMENTS 9,821,819 B2 * 11/2017 Frazier .................... B61C 17/02
10,065,511 B2 * 9/2018 Yamasaki ................ B61C 3/00
(Continued)

FOREIGN PATENT DOCUMENTS

EP 1288060 A1 3/2003
EP 1977948 A2 10/2008
(Continued)

OTHER PUBLICATIONS

French Search Report for French Patent Application No. FR 2007880, dated Mar. 24, 2021 in 3 pages.

*Primary Examiner* — S. Joseph Morano
*Assistant Examiner* — Cheng Lin
(74) *Attorney, Agent, or Firm* — KNOBBE MARTENS, OLSON & BEAR LLP

(57) ABSTRACT

An assembly includes a locomotive, equipped with a roof line, electrically connected to a pantograph, a control system and a sensing circuit. The control system orders, depending on the voltage on the roof line detected by the sensing circuit, the open or closed state of a switch between the roof line and a power supply circuit of the motors of the locomotive. The assembly also includes a tender, coupled to the locomotive and carrying batteries suitable for delivering a current for supplying the motors. The tender is electrically connected to the locomotive in such a way that a first terminal of the batteries is connected to the roof line and a second terminal of the batteries is connected to a point of the locomotive set to a reference potential.

10 Claims, 2 Drawing Sheets

(51) Int. Cl.
*B60L 9/08* (2006.01)
*B60L 9/30* (2006.01)
*B60L 50/51* (2019.01)
*B60L 50/53* (2019.01)

(52) U.S. Cl.
CPC .............. *B60L 50/51* (2019.02); *B60L 50/53* (2019.02); *B60L 2200/26* (2013.01)

(58) Field of Classification Search
CPC ...... B60L 9/02; B60L 9/04; B60L 9/08; B60L 9/18; B60L 50/53; B60L 2200/26
See application file for complete search history.

(56) References Cited

U.S. PATENT DOCUMENTS

2002/0177929 A1    11/2002  Kumar
2018/0287544 A1 *  10/2018  Kato ..................... H02M 1/38

FOREIGN PATENT DOCUMENTS

| EP | 1977948  | A3  |   | 5/2009  |              |
|----|----------|-----|---|---------|--------------|
| EP | 2340958  | A1  | * | 7/2011  | ............... B60L 3/00 |
| EP | 2810812  | A1  |   | 12/2014 |              |
| EP | 2810813  | A1  | * | 12/2014 | .......... B60L 11/1809 |
| EP | 3238975  | A1  | * | 11/2017 | ............ B60L 3/0069 |
| EP | 3616975  | A1  |   | 3/2020  |              |
| FR | 3061094  | A1  |   | 6/2018  |              |
| JP | H09261803| A   | * | 10/1997 | .......... B60L 11/1809 |
| JP | 2020058105| A  | * | 4/2020  | ............ B60L 3/0069 |

\* cited by examiner

TRACTION ASSEMBLY INCLUDING A LOCOMOTIVE AND A TENDER AND ASSOCIATED METHOD

CROSS-REFERENCE TO RELATED APPLICATION

This application claims priority to Japanese Patent Application No. FR 20 07880 filed on Jul. 27, 2020, the disclosure of which including the specification, the drawings, and the claims is hereby incorporated by reference in its entirety.

FIELD OF THE INVENTION

The present invention relates to locomotives of the single-current, dual-current, tricurrent or higher type, operating by harnessing at least one electric power, AC or DC.

For example, a dual-current locomotive is suitable for picking up either a first electrical power, in particular single-phase, by means of a first dedicated pantograph, or a second electrical power, in particular DC, by means of a second dedicated pantograph.

BACKGROUND OF THE INVENTION

There is a need to modernise an existing fleet of locomotives by equipping them with on-board energy storage facilities capable of delivering electrical power to the locomotive's traction motors. Such energy storages are for example batteries, supercapacitors, fuel cells, etc.

This would allow, when such a modernised locomotive is running on a track equipped with a catenary, but a section of the catenary is not powered (e.g. due to a malfunction), to allow the locomotive to operate autonomously to cross the corresponding section of track.

This would also allow these modernised locomotives to run autonomously along routes that include sections of track that are not equipped with catenary lines. Incidentally, this would allow new sections of track to be brought into service without the need for catenary lines, i.e. electrification, thus reducing infrastructure costs.

Locomotives with on-board energy storage are known. However, these are integrated into the locomotive's power circuit from the design stage and/or have a reduced capacity/autonomy.

Such an approach is not suitable for retrofitting an existing locomotive, as it would be both complex and too expensive to modify the power circuit of such a locomotive. Moreover, the integration of such on-board energy storage is not always possible due to the volume available on board a locomotive.

SUMMARY OF THE INVENTION

The aim of the invention is therefore to address this problem, in particular by proposing a solution that is simple to implement and that allows existing locomotives to be modernized with minimum effort.

The object of the invention is a traction assembly comprising a locomotive, the locomotive comprising a roof line electrically connected to at least one pantograph, a control system and a sensing circuit, the control system being capable of controlling, as a function of the instantaneous properties of a voltage on the roof line detected by the sensing circuit, the open or closed state of at least one switching device placed between the roof line and a circuit supplying the traction motors of the locomotive, said traction assembly being characterized in that it also comprises a tender, mechanically coupled to the locomotive, the tender carrying energy storage suitable for delivering a current for supplying the traction motors, the energy storage having a first terminal and a second terminal and in that the tender is electrically connected to the locomotive in such a way that the first terminal is connected to the roof line of the locomotive and the second terminal is connected to a point on the locomotive which is brought to a reference potential.

According to particular embodiments, the traction assembly comprises one or more of the following features taken in isolation or in any combination that is technically possible:
   said at least one switching device comprises a DC switching device comprising, in series, a first DC switching device between a point of the roof line and an intermediate point and a second DC switching device between the intermediate point and a point constituting an input of the power supply circuit of the traction motors, the first terminal of the energy storage being connected to the intermediate point so as to be linked to the roof line through the first DC switching device;
   the roof line is electrically connected to a single-phase pantograph suitable for collecting a single-phase current and to a direct-current pantograph suitable for collecting a direct current, the control system being suitable for controlling, as a function of the instantaneous properties of the voltage on the roof line detected by the sensing circuit the open or closed state of a single-phase switching device located between the roof line and a single-phase power supply circuit for the traction motors of the locomotive and to control the open or closed state of a DC switching device located between the roof line and a DC power supply circuit for the traction motors of the locomotive;
   the single-phase power circuit successively comprises a transformer, a single-phase/DC converter, a first filter device, and an inverter connected to at least one traction motor, and wherein the DC power supply circuit successively comprises a second filter device and the inverter, the first and second filter devices having different inputs, sharing common components and a common output to the inverter;
   the locomotive comprises, preferably in the cab, a selector enabling an operating mode to be selected from among: a collection mode corresponding to the use of a single-phase or DC power collected by the pantograph and an autonomous mode corresponding to the use of a DC power delivered by the energy storage of the tender, the selector being suitable for transmitting to the control system information indicative of the selected operating mode to be taken into account in order to control the open or closed state of the or each switching device;
   the traction assembly is such that: the tender is equipped with a pair of first connectors, respectively electrically connected to the first terminal and the second terminal of the energy storage; the locomotive is equipped with a pair of second connectors, a high-voltage cable connecting one of the second connectors to the roof line and an earth cable connecting the other of the second connectors to the reference potential of the locomotive, and an electrical link between the tender and the locomotive is provided by a first and a second electrical cable, connected between the first and the second connectors;

the pair of second connectors is provided on one or each end face of the locomotive and the high-voltage cable runs along the locomotive body to the roof of the locomotive;

the energy storage are adapted to deliver a direct current of between 1.5 kV DC and 3 kV DC; and the energy storage are adapted to be recharged by electrical power captured by said at least one pantograph.

The invention also relates to a method of selecting a source of electrical power, implemented by a control system of a traction assembly according to claim 2, said method comprising the steps of, when selecting a mode of operation corresponding to the use of DC power delivered by the energy storage of the tender: locking the pantograph in a lowered position and closing the first DC switching device; detecting zero voltage on the roof line; activating the energy storage to supply DC voltage to the roof line; detecting a voltage within a predetermined range of values on the roof line; and closing the second DC switching device.

BRIEF DESCRIPTION OF THE DRAWINGS

The invention and its advantages will be better understood upon reading the following description of a particular embodiment, given only as an example, and with reference to the attached drawings, in which.

DETAILED DESCRIPTION OF THE PREFERRED EMBODIMENTS

Figure 1:
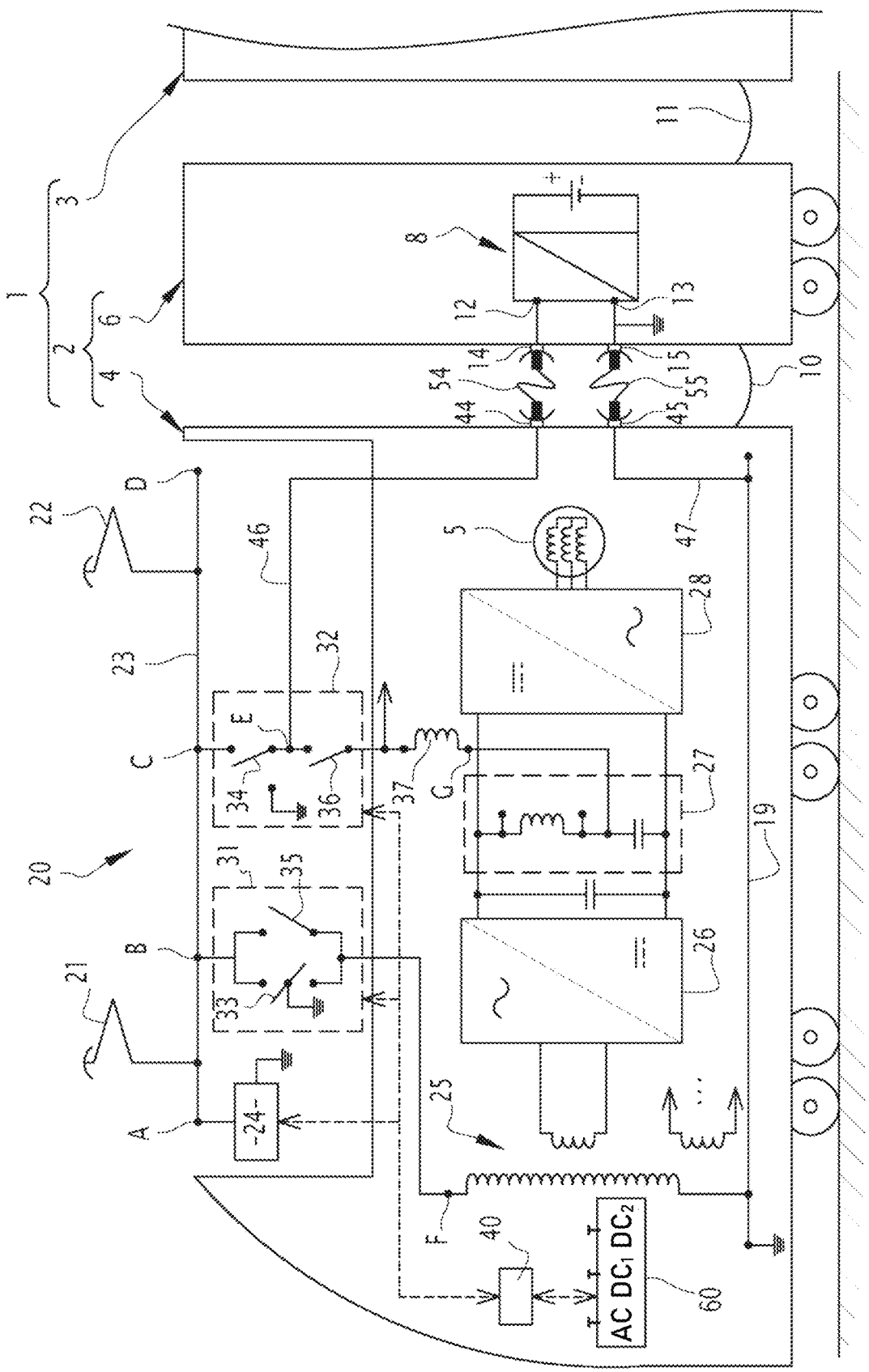
FIG. 1 is a schematic representation of a traction assembly consisting of a locomotive and a tender, more particularly the power circuit of such a traction assembly; and, FIG. 2 is a flowchart of an operating method of the assembly of FIG. 1.

FIG. 1 shows a train 1 consisting of the coupling of a traction assembly 2 with one or more cars 3, such as passenger cars.

The train includes a control system 40 for controlling the various equipment on board the train. This control system is known as the train control and management system (TCMS).

The traction assembly 2 is itself made up of the coupling of a locomotive 4, for example of the two-current type, and a tender 6.

Historically, a tender is an auxiliary car that follows a locomotive and contains a reserve of fuel necessary to supply the locomotive.

According to the invention, the tender 6 carries an energy storage, generally referred to by the number 8, capable of delivering a direct electric current. These energy storages 8 are, for instance, constituted by a source (such as batteries, supercapacitors, fuel cells, mixed (fuel cell/battery), or any device known to the skilled person) and a current converter, such as a DC-DC converter or alternatively a DC-AC converter.

The energy storage 8 comprises a first terminal 12 and a second terminal 13. The latter is advantageously electrically connected to a point on the tender 6 set to a reference potential.

The locomotive 4 comprises a power circuit 20 for supplying the electric traction motors of the locomotive 4. In FIG. 1, only one motor 5 is shown, but a locomotive usually has two or four motors.

The circuit 20 allows current to be taken from an overhead line, such as a catenary (not shown in FIG. 1). In the example shown in FIG. 1, a dual-current locomotive is shown and the circuit 20 therefore allows either single-phase or direct current to be taken from a point of contact with a power source, such as a catenary.

The power circuit 20 includes an earth line 19, electrically connected to a point set to a reference potential.

The power circuit 20 comprises, on the roof of the locomotive 4, a first pantograph dedicated to the collection of a single-phase current, or AC pantograph 21, and advantageously a second pantograph dedicated to the collection of a direct current, or DC pantograph 22.

Alternatively the power circuit comprises only one of the first and second pantographs or more than two pantographs and the power circuit is adapted accordingly.

Each pantograph 21, 22 is electrically connected to a roof line 23.

The roof line 23 extends along the roof of the locomotive 4 between two end points A and D.

A sensing device 24 is electrically connected to the roof line 23, for example at the front end point A. The function of this device is to detect, at any time, the properties of the potential to which the roof line 23 is set and to transmit this information to the control system 40.

Based on the results of this detection, the control system 40 controls the status of the various equipment, in particular the opening or closing of isolation devices 31 and 32 discussed below in detail, to properly route electrical power to the motors.

In order to convey single-phase power, the roof line 23 is electrically connected, through a single-phase/AC isolation device 31, to a point F constituting a first terminal of the primary of a transformer 25.

The second terminal of the primary of the transformer 25 is electrically connected to the earth line 19.

The secondary of the transformer 25 is connected to the input of a single-phase/DC converter 26.

The DC current output from the converter 26 is applied to a first input of a filter device 27.

The filtered DC current output from the filter device 27 is applied to the input of an inverter 28.

The function of the inverter 28 is then to convert a filtered direct current into a three-phase current suitable for powering the motor 5.

As the locomotive has several motors on board, it comprises as many conversion chains, each conversion chain consisting of a single-phase/DC converter (connected to the secondary of transformer 25), a filter device and an inverter as described above.

In order to convey DC power, the roof line 23 is electrically connected, through a DC isolating device 32, to a point G constituting a second input of each of the filter devices 27 of the locomotive power systems.

Advantageously, an inductor 37 is interposed between the DC isolation device 32 and the point G.

The direct current delivered at the output of a filter device 27 is then applied to the input of the inverter 28 in order to be transformed into a three-phase current for supplying the corresponding motor 5.

The AC isolation device 31 comprises a single-phase/AC isolation switch 33 and a single-phase/AC circuit breaker 35, connected in parallel to each other.

Specifically, one terminal of the AC isolation switch 33 and one terminal of the AC circuit breaker 35 are connected to a point B of the roof line 23 and the other terminal of the AC isolation switch 33 and the other terminal of the AC circuit breaker 35 are connected to point F.

The control system 40 is adapted to control the open or closed state of the AC circuit breaker 35 according to the type (AC/DC) and voltage level detected by the sensing circuit 24 at the line 23. For example, the control system 40 is adapted to control the closing of the AC circuit breaker 35 if the sensing circuit detects an AC voltage of 25 kV.

The AC isolation switch 33, which is suitable for earthing the roof line 23, is intended to be controlled, preferably manually, between its closed and open state. In particular, the AC isolation switch 33 is intended to be manually operated in the closed earthing state via a manipulation key, during an operation to ground the line 23.

The DC isolation device 32 is equipped in series with a DC isolation switch 34 and a DC circuit breaker 36.

More specifically, one terminal of the isolation switch DC 34 is connected to a point C of the roof line 23 and the other terminal of the isolation switch DC 34 is connected to an intermediate point E. One terminal of the DC circuit breaker 36 is connected to the intermediate point E and the other terminal of the DC circuit breaker 36 is connected to the inductor 37.

The control system 40 is adapted to order the open or closed state of the DC circuit breaker 36 depending on the type (AC/DC) and voltage level detected by the sensing circuit 24 at the line 23. For example, the control system 40 is adapted to order the closing of the DC circuit breaker 36 if the sensing circuit detects a DC voltage of 1.5 kV.

In addition, the control system 40 is adapted to order the open or closed state of the DC isolation switch 34 when a DC voltage is supplied on the line 23. For example, the driver enters at an interface to the control system 40 that he is on a DC-powered portion of track and the control system 40 orders the closing of the DC isolation switch 34.

Other equipment may be provided, such as lightning protection devices, pantograph isolation, power measurement systems, etc.

According to the invention, the tender 6 is mechanically coupled to the locomotive 4 by a coupling link 10.

The tender 6 is furthermore electrically coupled to the locomotive 4 so that the energy storage 8 can supply electrical power to the traction motors 5 of the locomotive 4.

For this purpose, dedicated connectors 14 and 15 are provided on a front side of the tender body 6. They are respectively electrically connected to the first terminal 12 and the second terminal 13 of the energy storage 8. Advantageously, the tender comprises a safety circuit breaker between the terminal 12 and connector 14.

Dedicated connectors 44 and 45 are also provided on the locomotive body 4, for example on each of the end faces of the locomotive body 4, in order to be able to electrically connect the tender to the locomotive regardless of the direction of the locomotive (reversal).

The electrical connection between the tender 6 and the locomotive 4 is made by a first electrical cable 54, coupled at one end to the connector 14 of the tender and at the other end to the connector 44 of the locomotive, and by a second electrical cable 55 coupled at one end to the connector 15 of the tender and at the other end to the connector 45 of the locomotive.

On the locomotive side 4, one or more high-voltage cables 46 connect the connector 44 to the roof line 23. Advantageously, the high voltage cable 46 is connected to the intermediate point E in such a way that it can be isolated or connected to the roof line 23 depending on the open or closed state of the DC isolation switch 34.

Alternatively, if the tender is suitable for providing a single-phase electrical signal, the cable 46 is advantageously connected to the input of the single-phase circuit breaker 35 and an isolation switch is provided, for example, between the roof line 23 and the single-phase circuit breaker 35.

Advantageously, the high-voltage cable 46 runs outside the locomotive body 4 on the locomotive roof. Depending on the configuration of the engine, it can be installed inside the locomotive.

One or more earth cables 47 connect the connector 45 to the earth line 19 of the locomotive 4. As a result, the tender and the locomotive share the same reference potential.

In addition, to select the power supply mode of the locomotive, a selector switch 60 is provided on board the locomotive, advantageously in the cab. It allows the driver to select one mode from one or more collection modes and an autonomous mode. For example, three possible operating modes are considered for a dual-current locomotive:

- a first mode by collection corresponding to the use of a single-phase power collected by the first AC pantograph 21 (typically for example 25 kV AC);
- a second mode by collection corresponding to the use of a DC power collected by the second DC pantograph 22 (typically for example 1.5 kV DC); and,
- a third autonomous mode corresponding to the use of a DC power delivered by the on-board energy storage (typically 1.5 kV DC).

The information corresponding to the state of the selector 60, and consequently to the operating mode selected by the driver, is transmitted to the control system 40 which is adapted to order the pantographs to move and/or to configure the power circuit 20 according to this information.

Figure 2:
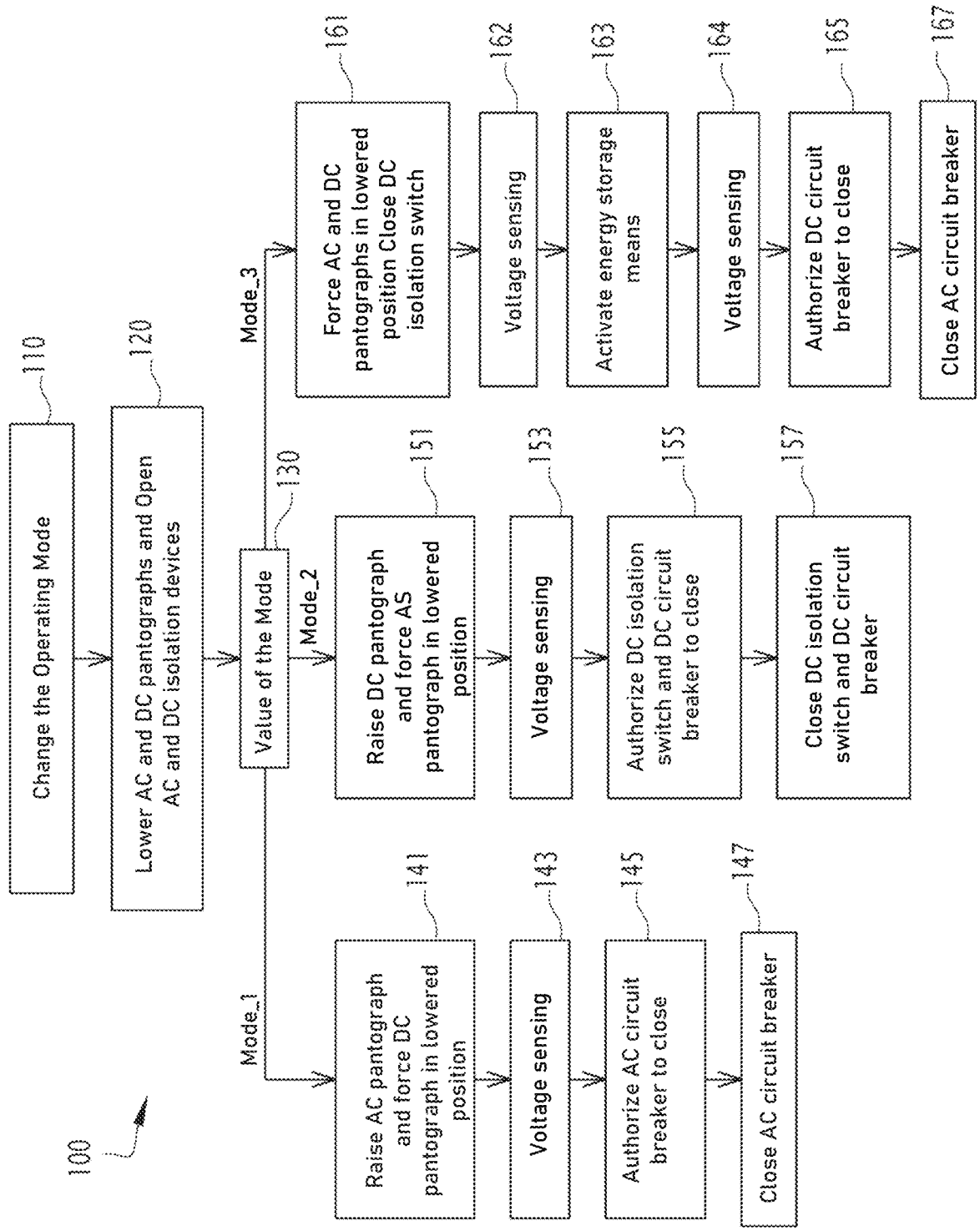

According to the invention, the control system 40 is programmed to implement the method of selecting an electrical power source shown in FIG. 2 upon a change in the mode of operation.

The method 100 begins when, at step 110, the driver changes the current operating mode, i.e., the power source to be used for powering the traction motors, by selecting a new operating mode using the selector 60. Thus, the control system 40 and the tender receive information indicative of the new operating mode.

In step 120, the AC and DC pantographs are lowered and the circuit breakers 35, 36 and the isolation switch 34 are switched to the open state.

In step 130, the value of the new operating mode is tested.

If the new mode corresponds to the first mode Mode_1, then in step 141 the AC pantograph is lifted so as to be brought into contact with a catenary delivering a single-phase current. The pantograph DC is then locked in the lowered position and the switch 34 is in an isolation position in which it isolates the intermediate point E from the potential of the roof line 23. Advantageously, the circuit breaker 36 is kept in the open state.

Then, in the next step 143, the sensing circuit 24 detects that the roof line 23 is set to a single-phase potential within an acceptable voltage range.

In response, in step 145, the control system 40 allows the AC circuit breaker 35 to close, while keeping the DC circuit breaker 36 open. The switch 34 is also held in its isolated position.

Finally, in step 147, the AC 35 circuit breaker is closed. Under these conditions, the single-phase current picked up by the AC pantograph 21 is applied, via the transformer 25, to the input of each of the power systems.

If the new mode corresponds instead to the second mode Mode_2, then in step 151 the DC pantograph 22 is moved to the raised position so as to be brought into contact with a catenary supplying a direct current and the switch 34 is moved to the closed state electrically connecting the point E to the potential of the roof line 23. The AC pantograph is then locked in the lowered position and the circuit breaker 35 is kept in the open state.

In step 153, the sensing circuit 24 detects the presence of a DC current on the roof line 23.

In response, in step 155, the control system 40 allows the DC circuit breaker 36 to close, while keeping the AC circuit breaker 35 open.

Finally, in step 157, the DC circuit breaker 36 is closed. Under these conditions, the DC current collected by the DC pantograph 22 is applied, via the filter device 27, directly to the input of the inverter 28 of each of the power systems.

Finally, if in step 130 it is determined that the new mode corresponds to the third mode MODE_3, then in step 161 the AC pantograph 21 and DC pantograph 22 are forced into their lowered position and the switch 34 is moved to the closed state electrically connecting the point E to the potential of the roof line 23.

In step 162, the sensing circuit 24 does not detect any voltage on the roof line 23, since the AC 21 and DC 22 pantographs are forced into their lowered position and the circuit breakers 35, 36 are open.

In response, in step 163, the control system 40 activates the energy storage 8 so as to power the lines 54 and 46. This results in voltage being applied from terminal 12 of the energy storage 8 to the roof line 23 via the switch 34.

Then, in step 164, the sensing circuit 24 detects a DC voltage on the roof line 23. In response, in step 165, the control system 40 allows the DC circuit breaker 36 to close, while keeping the AC circuit breaker 35 open.

Finally, in step 167, the DC circuit breaker 36 is closed. Under these conditions, the direct current delivered by the energy storage 8 is applied, via the filter device 27, directly to the input of the inverter 28 of each of the power systems.

The person skilled in the art will note that the traction assembly according to the invention allows a simple modernization of a locomotive of the current collection type. Connecting the energy storage on board the tender directly to the roof line via a high voltage cable is easy to achieve in practice. The energy storage on board the tender are chosen to deliver a current adapted to the power circuit of the locomotive.

In the case of a dual-current single-phase/DC locomotive and energy storage delivering direct current, by connecting the high voltage cable to the roof line via the isolation switch 34, this component is reused to protect the energy storage when the roof line is set to a single-phase voltage. Furthermore, while the roof line is set to a DC voltage in the second collection mode of operation, the collected current can advantageously be used to recharge the energy storage of the tender, via the isolation switch 34.

Alternatively, the locomotive is not dual-current but three or more currents, being able to receive for example multiple types of single-phase currents and/or multiple types of direct currents by means of its pantographs.

In another embodiment, the locomotive is a single-current locomotive even though the preferred embodiment described above is a dual-current locomotive.

What is claimed is:

1. A traction assembly comprising a dual-current locomotive, the dual-current locomotive comprising:
    a single-phase pantograph configured to collect a single-phase current from an overhead wire and a direct current pantograph configured to collect a direct current from the overhead wire;
    a roof line to which the single-phase pantograph and the direct current pantograph are electrically connected;
    a single-phase switch electrically connected between the roof line and a single-phase power supply circuit of at least one traction motor of the dual-current locomotive;
    a direct-current-phase switch electrically connected between the roof line and a direct-current power supply circuit of the at least one traction motor of the dual-current locomotive;
    a sensing circuit adapted to detect instantaneous properties of a voltage on the roof line, and a control system adapted to command, as a function of the instantaneous properties of the voltage on the roof line detected by the sensing circuit, an open or closed state of the single-phase switch and an open or closed state of the direct-current switch,
    wherein said traction assembly further comprises a tender mechanically coupled to the dual-current locomotive, the tender carrying an energy storage configured to deliver a current for supplying the at least one traction motors of the dual-current locomotive, the energy storage having a first terminal and a second terminal, and
    wherein the tender is electrically connected to the dual-current locomotive in such a way that the first terminal is directly electrically connected to the roof line of the dual-current locomotive by a high-voltage cable and the second terminal is connected to a point on the dual-current locomotive which is set to a reference potential, so that when the energy storage is activated, a tender voltage is applied from the first terminal of the energy storage to the roof line, and, based on the sensing circuit detecting the tender voltage on the roof line, the control system commands the open or closed states of the single-phase switch and the direct-current switch to power the single-phase power supply circuit or the direct current power supply circuit with a tender power delivered by the energy storage of the tender.

2. A traction assembly according to claim 1, wherein the direct current switch comprises a DC switch having, in series, a first DC switch between a point of the roof line and an intermediate point and a second DC switch between the intermediate point and a point constituting an input of the power supply circuit of the traction motors, the first terminal of the energy storage is connected to the intermediate point so as to be connected to the roof line through the direct-current DC switch.

3. A method of selecting a source of electrical power, implemented by a control system of a traction assembly in accordance with claim 2, said method comprising, when selecting an operating mode corresponding to the use of a DC power delivered by the energy storage of the tender:
    locking the single-phase pantograph and the direct-current pantograph in the lowered position and closing the first DC switch;
    detecting a zero voltage on the roof line;
    activating the energy storage to deliver a DC voltage to the roof line;
    detecting a voltage within a predetermined range of values on the roofline; and closing the second DC switch.

4. A traction assembly according to claim 1, wherein the single-phase power supply circuit successively comprises a transformer, a single-phase/DC converter, a first filter, and an inverter connected to at least one traction motor and wherein the DC power supply circuit successively comprises a second filter and the inverter, the first and second filters having different inputs, sharing common components and a common output to the inverter.

5. A traction assembly according to claim 1, wherein the dual-current locomotive comprises, preferably in the cab, a selector making it possible to select an operating mode from: a collection mode corresponding to the use of a single-phase or DC power collected by the pantograph and a stand-alone mode corresponding to the use of a DC power delivered by the energy storage of the tender, the selector being suitable for transmitting to the control system information indicative of the selected operating mode to be taken into account for ordering the open or closed state of each switch.

6. A traction assembly according to claim 1, wherein:
the tender is equipped with a pair of first connectors, respectively electrically connected to the first terminal and the second terminal of the energy storage;
the dual-current locomotive is equipped with a pair of second connectors, a high-voltage cable connecting one of the second connectors to the roof line and an earth cable connecting the other of the second connectors to the reference potential of the dual-current locomotive, and
wherein an electrical connection between the tender and the dual-current locomotive is provided by first and second electrical cables connected between the first and second connectors.

7. A traction assembly according to claim 6, wherein the pair of second connectors is provided on one or each end face of the dual-current locomotive and the high voltage cable runs along the body of the dual-current locomotive to the roof of the dual-current locomotive.

8. A traction assembly according to claim 1, wherein the energy storage is adapted to deliver a direct current of between 1.5 kV DC and 3 kV DC.

9. A traction assembly according to claim 1, wherein the energy storage is adapted to be recharged by electrical power captured by the single-phase pantograph or the direct-current pantograph.

10. The traction assembly according to claim 1, wherein the high-voltage cable is a cable having a capacity that makes the energy storage of the tender to deliver an enough current adapted to the power circuit of the dual-current locomotive.

* * * * *